April 3, 1951 — E. A. KNIEP — 2,547,130
COMBINATION SAFETY HITCH AND PLOW TRIP
Filed July 7, 1948

Elmer A. Kniep
INVENTOR.

BY Clarence A. O'Brien
and Harvey B. Jacobson
Attorneys

Patented Apr. 3, 1951

2,547,130

UNITED STATES PATENT OFFICE 2,547,130

COMBINATION SAFETY HITCH AND PLOW TRIP

Elmer A. Kniep, Squirrel, Idaho

Application July 7, 1948, Serial No. 37,455

1 Claim. (Cl. 97—183)

The present invention relates to a novel and improved hitch which is adapted to aptly and satisfactorily couple the tongue of a plow, preferably a two-way or roll-over style of plow, with a tractor or an equivalent draft vehicle and has more specific reference to novel progressively operable safety features which are incorporated in said hitch.

More specifically, the invention has reference, briefly stated, to a spring included overload hitch which, at the front of the hitch, is provided with a safety release connectable with a clevis on a tractor and there being a trip rod at the rear of the hitch which trip rod is connectable with a trip lever such as is commonly provided on a roll-over or "tumble" plow as it is sometimes called, whereby to obtain advantageous results not heretofore achieved in this line of endeavor.

In carrying out a preferred embodiment of the invention I provide a substantially rectangular frame which has one end portion directly bolted or otherwise rigidly connected with the tongue of the roll-over plow, said frame carrying a complemental inner frame which slides on and primarily within the confines of the outer frame, the two frames being retained in predetermined relationship by compression springs and said inner frame serving as a support, at its forward end, for the safety latch which connects with the tractor clevis and which is provided at the opposite end with a self-aligning and accomodating trip rod which connects at its trailing end, through a clevis or the like, with a trip lever, the part which is released for purposes of tumbling the plow means which is then "up" to a "down" position.

It is a matter of common knowledge that the so called "tumble" or two-way roll-over plow is equipped with two wheels and that when the forward end of the draft tongue is connected with the tractor, a straight through hookup, without hinges, is made. To cope with plowing difficulties where rocky soil is encountered it is common practice, on current types of plows, to have a safety hitch which will trip automatically when a plow share hits a rock or similar solid object, whereby to allow the plow tongue to drop with the plow still in the ground. In order to make the hookup again the attendant resorts to the use of make shift devices and usually employs a pry-pole, lifting jack, or, like I have often done, uses a short chain. The short chain is hooked in the plow hitch and when the tractor is again put into motion, the trip rope is pulled, allowing the plow to tumble. Then, after the plow is out of the ground, the operator is required to dismount from the tractor and hook the plow up to the tractor direct again and obviously all of these duties involve an expenditure of considerable effort and time. In order to save time and to overcome an expenditure of undue effort and labor, I have evolved and produced a hitch which, as above stated, has safety release or latch means at the front which is connectable with the tractor, and a rigid but self accommodating trip rod at the rear end which is connectable with the trip lever on a roll-over plow whereby to provide an arrangement which automatically trips and tumbles the plow so that all the operator has to do is swing around promptly, catch hold of a trip rope, which is usually provided, to drop the plow again with a loss of but little time.

Other objects and advantages will become more readily apparent from the following description and the accompanying illustrative drawings.

In the drawings, wherein like numerals are employed to designate like parts throughout the views.

Figure 1:
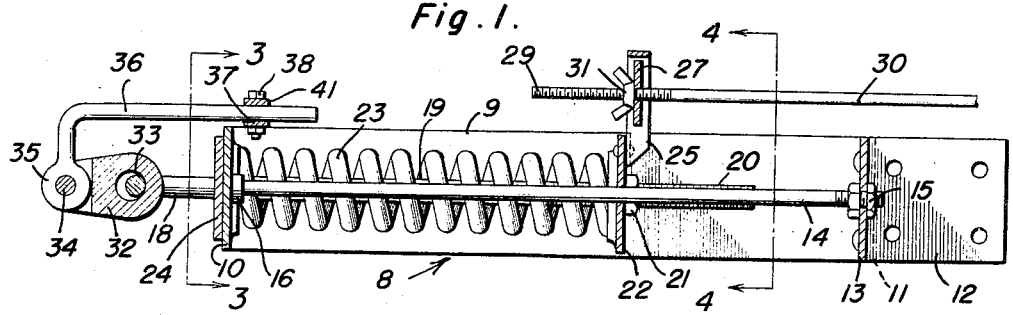
Figure 1 is a view partly in section and partly in elevation which may be said to be taken centrally through the structure illustrated in Figure 2, showing all the essential details of my improved safety plow hitch.
Figure 3:
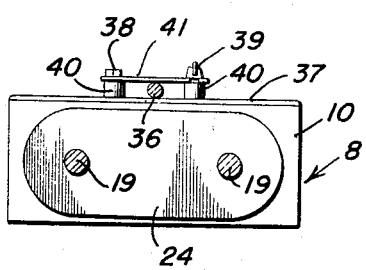
Figure 4:
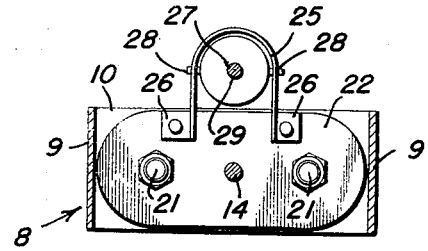
Figure 5:
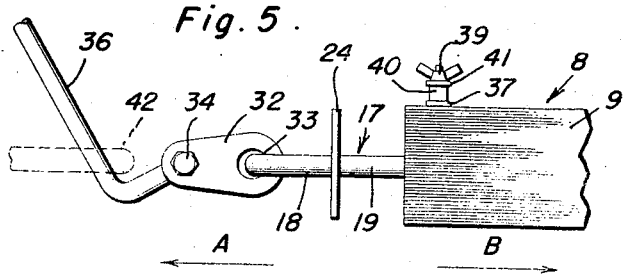

Figures 3 and 4 are cross sections on the lines 3—3 and 4—4 respectively of Figure 1, looking in the direction of the respective sets of arrows;

Figure 5 is a fragmentary elevational view showing the manner in which the latch serves to disconnect the tractor clevis from my improved hitch.

Figure 2:
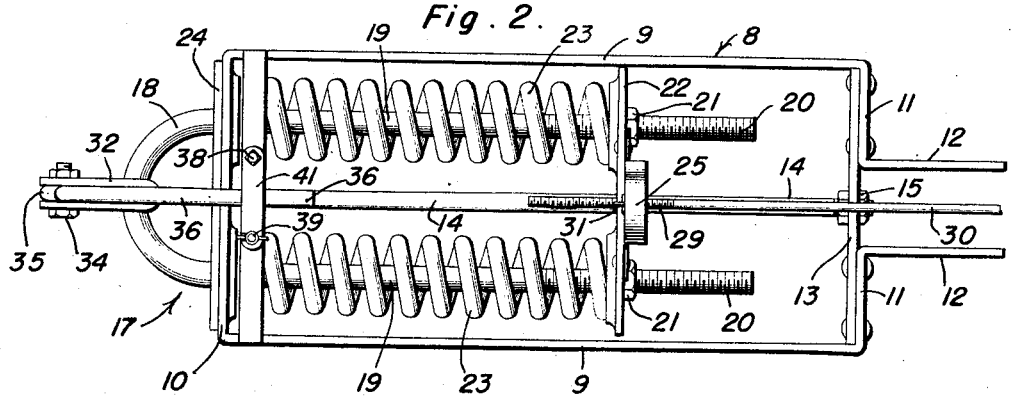
Figure 2 is a top plan view of the structure shown in Figure 1.

Referring now to the drawings by distinguishing reference numerals, the numeral 8 designates the main or foundational frame and this is of general rectangular form and includes longitudinal side members 9, a transverse front member 10, and inturned rear end portions 11, the latter having lateral trailing bends which define attaching ears 12. These ears are properly bolted and are adapted to straddle and be rigidly connected with the forward end of a draft tongue on a two-way or roll-over type plow (not shown). There is a cross-piece 13 rigidly riveted to the rear end portion of the frame and a reinforcing rod or bolt 14 is rigidly clamped or otherwise secured as at 15 to the central portion of said cross-piece and the opposite end of said rod is rigidly secured as at 16 to the central portion of the front transverse end member or cross-piece 10. The complemental and relatively slidable frame is denoted by the numeral 17 and this is a general U-shaped form and the bent or bight portion is exposed beyond the forward end of the frame 8 as shown in Figures 1 and 2. The arms of the frame are denoted by the numeral 19 and these extend in parallelism between the side members 9 of the frame where they are screw threaded as at 20. The screw threaded end portions are clamped by nuts 21 to a cross-head 22 which is slidable on the guide and assembling rod 14 as shown to advantage in Figures 2 and 4. Coiled expansion springs 23 are provided and these surround the limbs of the U-shaped frame and bear at their rear ends against said cross-head and at their forward ends against the end member or front cross piece 10 of the main frame as shown. Incidentally, there is a stay plate provided at 24 and this is disposed outwardly of the margin of the main frame and serves to connect the arms 19 together. It also serves as a stop in that it normally bears, by spring tension, against the adjacent forward end portion 10 of said frame 8. Normally then, the springs 19 are expanded and serve to hold the stay plate against the main frame 8 with the bight portion 18 of the frame 17 projecting as shown. A yoke 25 is provided and this has its end portions 26 riveted or otherwise connected with the cross-head 22 and said yoke serves to accommodate an apertured disc 27 having journals 28 rockably mounted in bearings provided in the side arms of said yoke. The central aperture in the rockable disc serves to accommodate the screw threaded end portion 29 of a trip rod 30. A thumb nut 31 is provided on the screw threaded end of the rod and this bears against the tiltable disc 27 and serves to adjustably connect the forward end of the trip rod with the yoke, by way of the tilting disc, and directly to the cross-head. Thus, the cross-head has bracket means comprising the yoke and the disc affording a suitable mount for an adjustably connected trip rod. The opposite end of the trip rod (not shown) is provided with a clevis (not shown) which in practice is suitably connected with a trip lever of a type used on conventional roll-over plow (not shown).

Referring now to the forward end of my improved hitch I call attention to a block-like adapter 32 which has a loose fitting connection as at 33 with the bight portion of the slidable U-frame 17. The forward end of the block or adapter is bifurcated and adapted with a pin, as at 34, to accommodate an eye 35 on the short limb of an L-shaped safety latch 36. The free or rear end portion of the latch, the long limb is releasably seated between a cross piece 37 fastened across the side members 9—9 of the frame 8. Said cross piece serves to accommodate bolts 38 and 39, the bolts having spacing collars 40 and one of said bolts, the one last named having a wing nut. These bolts serve to accommodate a keeper clip 41 which is hinged at the left hand end as shown in Figure 3 releasably connected by the wing nut and bolt at the opposite end. This permits the keeper to be swung open and closed to facilitate the step of making a hand locking connection between the latch and the keeper means. Normally, the latch is seated inside the keeper as shown in Figures 1 and 2. It is susceptible of moving forwardly in relation to the frame 8 as shown in Figure 5 where it swings open released position and serves to disconnect the hitch from the clevis 42 on the tractor (also not shown).

In practice the ears 12 are bolted or otherwise rigidly connected to the forward end of a draft tongue on a two-way roll-over type plow. The rear or trailing end of a trip rod 30 is connected by a clevis (not shown) to a trip lever on said plow which lever when operated serves to "tumble" the top or upper plow from its normal "up" position to a "down" position. The trip lever is also operated by a pull rope sometimes called a trip rope which runs from the rear portion of the seat of the driver of the tractor to the same trip lever on the plow (trip rope not shown). The latch comprising the latch 36 and connecting parts, is releasably connected to the clevis 42 on a powering tractor or the like (not shown).

As previously stated the trip rod 30 is adjustably connected by the bracket means to the spring retained U-shaped frame 17 and is substantially self-levelling and aligning. It is also adjustable by way of the nut 31 and threads 29. The trip rod moves in a forward direction and when the plow pulls too heavy and the springs 23 compress the frame 17, carrying the trip rod means at the rear end and the latch means at the forward end moves forwardly as at A in Figure 5 in relation to the rearwardly pulling frame 8 which is either at a standstill or is pulled under strain in the direction of the arrow B. In case the plow shares strike immovable or semi-immovable objects, the self-aligning trip rod will move in forward direction until the trip or latch on the plow beam or main frame is released, allowing the frame to roll over before any damage such as springing of beams or breaking of plow points occurs. The second movement of the trip rod is in the same direction only this is when the latch or trip is released by the operator through the medium of a trip rope or trip rod which is used on end of field when turning and rolling the plow over to plow in opposite direction. There is no vertical motion of the trip rod other than to keep it from binding when the hand trip rope or rod is in use. In case the plow should stick so it cannot trip or tumble, the latch means 36 will progressively come into play and allow the plow to disconnect from the tractor before any damage has been done to the plow. It follows that we have two frames slidably connected together to provide a hitch, spring means in the frames, a trip rod rigidly and adjustably mounted on the rear end of the inner frame, and automatic latch means on the forward end of the inner frame.

It is thought that persons skilled in the art to which the invention relates will be able to obtain a clear understanding of the invention after considering the specification in connection with the official drawings. Therefore, a more lengthy description is deemed to be unnecessary.

Minor changes in shape, size and rearrangement of parts may be resorted to in actual practice so long as they do not depart from the spirit of the invention, or the scope of the subjoined claim.

Having described the invention, what is claimed as new is:

In a hitch of the class shown and described, a substantially rectangular relatively stationary main frame provided at its rear end with means whereby said frame may be rigidly secured to a plow tongue, a rigid truss rod secured at opposite ends to corresponding end portions of said main frame and situated centrally between the side members of said main frame, a complemental U-shaped frame including a bight portion and parallel limb portions, said limb portions being slidable through guide openings in one end of said main frame and being reciprocable in spaces between said truss rod and the longitudinal members of said main frame, said bight portion being disposed exteriorly of the adjacent end member of the main frame, a cross-head within the confines of said main frame and slidably mounted on said truss rod and connected with adjacent rearward ends of the limbs of said U-shaped frame, coiled springs surrounding said limbs and interposed between said cross-head and forward end member of said main frame, an upstanding yoke rigidly connected to the central portion of said cross-head, a trip rod connectible at its rear end to a trip lever on a tumble-type plow, said trip rod being disposed in horizontal parallelism above said frames, and means carried by said yoke for pivotally and adjustably connecting said trip rod with said yoke, said means embodying a centrally apertured disk rockably mounted between the arms of said yoke, the coacting forward end of said trip rod having a screw-threaded portion slidable through said aperture and being provided with a thumb nut adapted to abut said disk.

ELMER A. KNIEP.

REFERENCES CITED

The following references are of record in the file of this patent:

UNITED STATES PATENTS

| Number | Name | Date |
|---|---|---|
| 1,195,191 | Dykshorn et al. | Aug. 22, 1916 |
| 1,372,413 | Flugekvam | Mar. 22, 1921 |
| 1,384,195 | Hulsebos et al. | July 12, 1921 |
| 1,811,267 | Gemberling et al. | June 23, 1931 |
| 1,935,707 | Glabus | Nov. 21, 1933 |
| 2,422,530 | Court | June 17, 1947 |